(No Model.)
M. OFFENBACHER.
FACET GRINDING MACHINE.
No. 556,515. Patented Mar. 17, 1896.
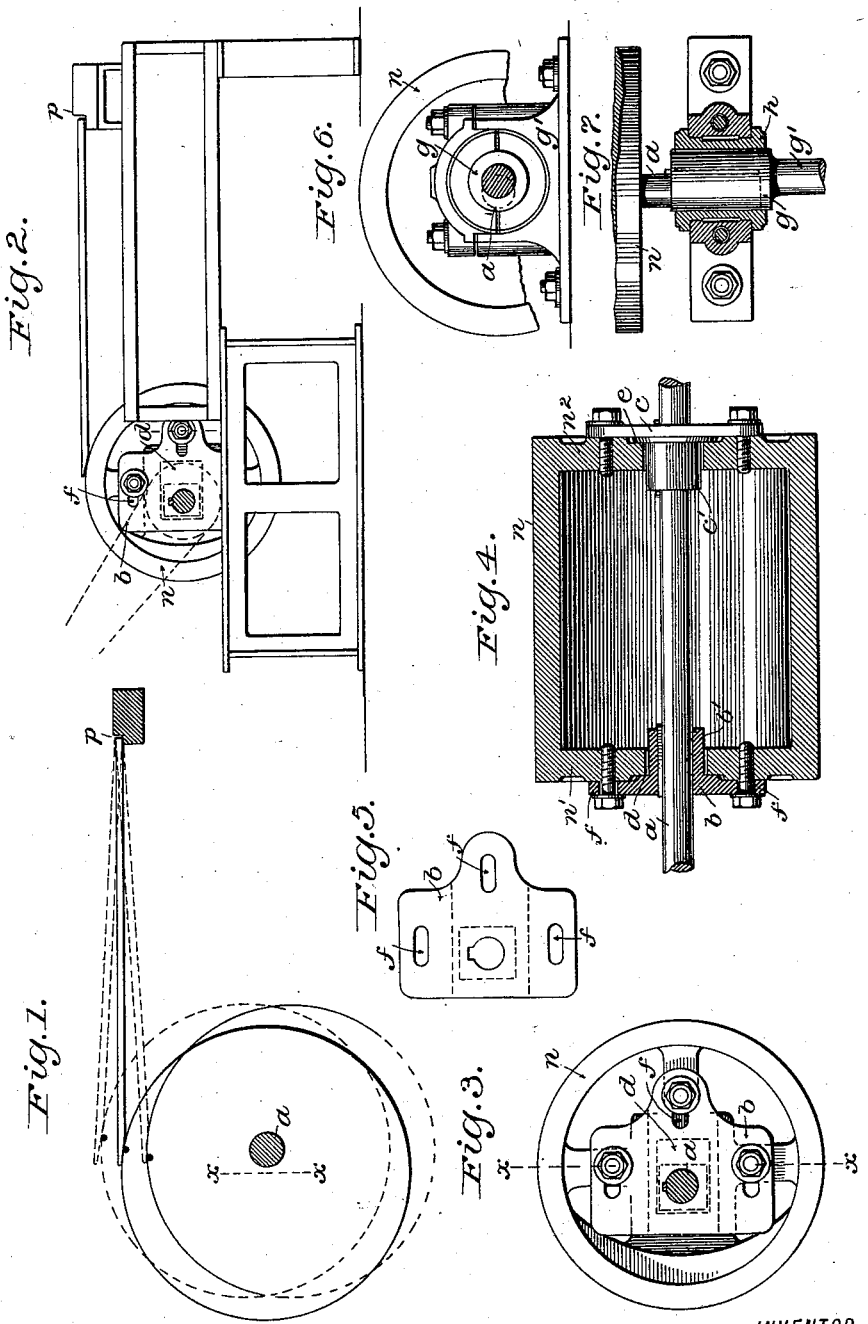
WITNESSES:
INVENTOR
Max Offenbacher
BY
Philip T. Dodge
ATTORNEY.

UNITED STATES PATENT OFFICE.

MAX OFFENBACHER, OF FÜRTH, GERMANY.

FACET-GRINDING MACHINE.

SPECIFICATION forming part of Letters Patent No. 556,515, dated March 17, 1896.

Application filed November 19, 1894. Serial No. 529,328. (No model.)

*To all whom it may concern:*

Be it known that I, MAX OFFENBACHER, manufacturer, a subject of the German Emperor, residing at Fürth, Bavaria, in the Empire of Germany, have invented certain new and useful Improvements in Facet-Grinding Machines with an Eccentric Roller or Cylinder, of which the following is a specification.

In order to grind flat facets on glass plates or disks by means of cylindrical rollers the process hitherto employed was carried out by placing the disk at the angle of the facet which it was desired to form and moving it to and fro during the grinding. The grinding-roller consequently only acted on the glass plate on one line only at the moment of the movement to another place of the facet-surface, and produced a straight-line bevel. When the necessary movement of the glass disk was carried out by hand this mode of grinding caused inequalities in the form of the facets, while on the other hand the mechanical adjustment of the whole plate of glass rendered it necessary to employ somewhat complicated arrangements, and also easily caused breakages of the glass. In order to remove these drawbacks the principle formerly employed is departed from in this invention, and the necessary shifting of the grinding place is brought about by the arrangement that the roller no longer rotates on its central axis, but on an axis lying to the side of the center of the roller—that is to say, it travels eccentrically. The glass disk or plate, which is arranged in the usual way, and pressed on the periphery of the roller by means of counterweights or the like, is consequently always raised or lowered on the edge which is to be faceted without undergoing a movement relative to the roller during one rotation of the latter. The edge operated on is consequently adjusted against the periphery of the grinding-roller without the point of support $p$—that is to say, the resting place of the glass plate—altering its position, and thus a flat facet is produced. By this means it is possible by suitably varying the eccentricity of the roller, as well as the point of contact, to obtain any suitable width of facet. In consequence of the circumstance that the moving part—that is, the cylindrical roller—is able to be exactly operated the greatest degree of exactitude in forming the facet is obtained by this improved method of grinding. The necessary arrangement for doing this has further the advantage that its use does not necessarily entail any modification or complication of the ordinary grinding apparatus, and the existing grinding-machines may be easily altered so as to work on the new system.

On the accompanying drawings, Figure 1 is a diagrammatic view of the displacement of the roller. Fig. 2 is a side view of the whole apparatus. Fig. 3 is a sectional view of the cylinder. Fig. 4 is a vertical sectional view of same. Fig. 5 is a detail of the inner part of the cylinder. Fig. 6 is a sectional end view of a modified form of the cylinder and its bearings. Fig. 7 is a plan view of part of the same partly in section.

The form of construction shown in Figs. 1 to 5 is intended for cases where entirely new machines are erected on the above-named system, and in these the grinding-roller is not directly connected with the machine-shaft $a$, but is connected with the same by means of transfer-disks $b$ and $c$. The above-named pulleys have rectangular naves $b'$ and $c'$, and are keyed firmly by means of these on the shaft $a$. The roller $w$ is provided with rectangular slots $d$ and $e$ on both sides, and, in fact, in the center of the front ends $w'$ and $w^2$, which are in the form of disks or crossarms. In these rectangular slots $d$ and $e$ the naves $b'$ and $c'$ are inserted and fitted. They may therefore be adjusted along the shaft $a$ within the limits determined by the length of the slots $d$ and $e$, so that their central axis $x$ lies eccentrically from the axis of rotation. When the roller in this position is screwed firmly with its front ends $w'$ $w^2$ on the disks $b$ and $c$, it runs eccentrically on the machine being set in action. By the disks $b$ and $c$ being provided with several adjacent or longitudinal screw-holes $f$ it is possible to vary the eccentricity within certain limits to a suitable extent, or when hollow facets are to be ground the shaft $a$ may be placed in the center of the roller, so that the latter runs concentrically.

The form of construction shown in Figs. 6 and 7 is more particularly intended for the cases where existing grinding-machines are to be modified to suit the new system. In this case eccentrics $g$ are secured on the ends of the spindles, and these are inserted as bearing-pins in the bearings $h$. The roller thus runs eccentrically also, while the driving-belt pulley which is seated on the projecting part $g'$ in the center of the eccentric rotates concentrically.

I declare that what I claim is—

1. In a facet-grinding machine the combination with a grinding-roller arranged eccentrically to the axis of rotation, of a fixed support for the article under treatment, substantially as described.

2. In a facet-grinding machine the combination of shaft $a$, disks $b$, $c$, seated thereon and adjustable longitudinally thereof, by means of a longitudinal guide, grooves or slots $d$, $e$, over naves $b'$, $c'$, and the roller $w$, attached to said disks.

In testimony whereof I have signed my name to this specification in the presence of two subscribing witnesses.

MAX OFFENBACHER.

Witnesses:
LEONHARD WASSERMANN,
CHAS. E. CARPENTER.